United States Patent [19]

Peter-Hoblyn et al.

[11] Patent Number: 5,809,774
[45] Date of Patent: Sep. 22, 1998

[54] SYSTEM FOR FUELING AND FEEDING CHEMICALS TO INTERNAL COMBUSTION ENGINES FOR $NO_X$ REDUCTION

[75] Inventors: Jeremy D. Peter-Hoblyn, Cornwall, Great Britain; James M. Valentine, Fairfield, Conn.; Theodore J. Tarabulski, Brewster, N.Y.

[73] Assignee: Clean Diesel Technologies, Inc., Stamford, Conn.

[21] Appl. No.: 752,344

[22] Filed: Nov. 19, 1996

[51] Int. Cl.$^6$ .................................................. F01N 3/00
[52] U.S. Cl. ................................ 60/274; 60/286; 60/301
[58] Field of Search ............................... 60/274, 286, 301

[56] References Cited

U.S. PATENT DOCUMENTS

| | | | |
|---|---|---|---|
| 3,876,391 | 4/1975 | McCoy et al. | 44/51 |
| 3,900,554 | 8/1975 | Lyon | 423/235 |
| 4,191,536 | 3/1980 | Niebylski | 44/63 |
| 4,208,386 | 6/1980 | Arand et al. | 423/235 |
| 4,403,473 | 9/1983 | Gladden | 60/274 |
| 4,609,342 | 9/1986 | Showalter | 431/2 |
| 4,629,472 | 12/1986 | Haney et al. | 44/51 |
| 4,665,690 | 5/1987 | Nomoto | 60/286 |
| 4,891,050 | 1/1990 | Bowers et al. | 44/67 |
| 4,892,562 | 1/1990 | Bowers et al. | 44/67 |
| 5,034,020 | 7/1991 | Epperly et al. | 44/358 |
| 5,057,293 | 10/1991 | Epperly et al. | 423/235 |
| 5,266,083 | 11/1993 | Peter-Hoblyn et al. | 44/358 |
| 5,404,841 | 4/1995 | Valentine | 123/25 |
| 5,535,708 | 7/1996 | Valentine | 123/25 |

FOREIGN PATENT DOCUMENTS

| | | |
|---|---|---|
| WO92/20764 | 11/1992 | WIPO . |
| WO95/02655 | 1/1995 | WIPO . |

OTHER PUBLICATIONS

Khalil, et al; "Reducing Diesel Particulate and $NO_x$ Emissions via Filtration and particle–Free Exhaust Gas Recirculation"; SAE Paper No. 950736; Detroit, MI; Feb. 27–Mar. 2,1995.

Konig, et al; "Research Results on Processes and Catalyst Materials for Lean $NO_x$ Conversion"; SAE Paper No. 962041.

Miyamoto, et al; "Significant $NO_x$ Reductions with Direct Water Injection into the Sub–Chamber of an IDI Diesel Engine"; SAE Paper No. 95069; Detroit, MI; Feb. 27–Mar. 2, 1995.

Takiguchi, et al; "'Catalytic Engine' $NO_x$ Reduction of Diesel Engines with New Concept Onboard Ammonia Synthesis System"; SAE Paper No. 920469.

Tsao, et al; "Puffing and Micro–Explosion Phenomena of Water Emulsion Fuels"; SAE Paper No. 860304; Detroit, MI, Feb. 24–28, 1986.

*Primary Examiner*—Thomas E. Denion
*Attorney, Agent, or Firm*—St. Onge Steward Johnston & Reens LLC

[57] ABSTRACT

Diesel and other lean-burn engines emit less $NO_x$, when the of fuel comprises an emulsion of hydrocarbon fuel and an aqueous solution of a nitrogenous $NO_x$-reducing reagent which is separated into its two principal portions prior to combustion. The hot exhaust gases produced by burning the fuel contain $NO_x$, but the $NO_x$ is reduced by introducing the separated aqueous solution of nitrogenous $NO_x$-reducing reagent into at least a portion of the exhaust gases and directing them to a catalyst for selective catalytic reduction of $NO_x$. The fuel emulsion preferably comprises a continuous phase comprising diesel fuel and from about 1 to about 20% (most preferably, from about 2 to about 10%) of a discontinuous phase comprising an aqueous solution of nitrogenous $NO_x$-reducing reagent. It is also preferred to include in the fuel a corrosion inhibitor and biocide, and optionally a lubricity additive and emulsifier.

20 Claims, 3 Drawing Sheets

5,809,774

SYSTEM FOR FUELING AND FEEDING CHEMICALS TO INTERNAL COMBUSTION ENGINES FOR $NO_x$ REDUCTION

DESCRIPTION

1. Technical Field

The invention provides a simple and effective means for delivering fuel and chemicals required by an engine and a selective catalytic reduction means. In one of its preferred aspects, the invention relates to reducing the emission of nitrogen oxides ($NO_x$) from diesel engines through the use of an aqueous nitrogenous reducing reagent, e.g., aqueous urea, for selective catalytic reduction (SCR), and improves on known systems of this type.

A number of systems are available for reducing $NO_x$ and other pollutants from internal combustion engines; however, many of these require the use of chemicals in addition to fuel. To date, there is no good way to supply both without compromising safety, convenience, effectiveness or cost. This is particularly true in the search for a suitable technology to handle the problem of $NO_x$ associated with diesel engines today and lean-burn gasoline engines in the future. Selective catalytic reduction would appear to offer promise from the standpoint of obtainable results, but it's application to internal combustion engines is fraught with difficulty.

Diesel engines have a number of important advantages over engines of the Otto type. Among them are fuel economy, reliability and long life. From the standpoint of emissions, however, they present problems more severe than their spark-ignition counterparts. Emission problems relate to particulates, nitrogen oxides ($NO_x$), unburned hydrocarbons (HC) and carbon monoxide (CO). It has been the experience in the art that all of these pollutants are interrelated, and as primary measures, such as engine modifications, are employed to reduce particulates and unburned hydrocarbons, NO emissions increase. Conversely, when combustion changes are implemented to reduce $NO_x$, then other pollutants, especially particulates, increase, as does fuel consumption.

Diesel engines operate with an excess of air to fuel, as such are "lean-burn" engines, with significant levels of oxygen in the exhaust gases. At such levels of oxygen, the catalyst system typically used for treating the exhaust from spark ignition engines, which run with close to stoichiometric balance of air and fuel, are not effective in reducing $NO_x$ generated by diesel engines. Proposed regulations will require lean-burn gasoline engines in order to improve fuel economy and reduce carbon dioxide emissions; however, there is no effective technology known to deal with the $NO_x$ emissions from these engines.

Lean-burn $NO_x$ catalysts have been under development for some years. They require a hydrocarbon reagent to react with $NO_x$. This reagent can be supplied by injecting fuel into the exhaust or by carrying a separate reservoir of hydrocarbon for this purpose. The use of diesel fuel as reagent clearly is a simple embodiment of such systems. However, so far, such systems achieve only some 20 to 40% $NO_x$ reduction, deteriorate significantly from poisoning by sulfur in the fuel, and use additional fuel as reagent.

Selective catalytic reduction with ammonia, on the other hand, is a well proven process for reducing $NO_x$ by very high efficiency, typically 70 to 90%. Such systems can be designed to operate where significant levels of sulfur and oxygen are present in the exhaust gas.

The use of selective catalytic reduction requires a system for providing ammonia distributed in the exhaust gas. Storage of anhydrous or aqueous ammonia (particularly in a moving vehicle) can be hazardous.

Urea is a nonhazardous material which decomposes to ammonia and other active species and could be used. However, the use of urea or other reasonably safe reagent is not without practical drawbacks: first, additional time and equipment are required for replenishing the supply of aqueous reducing reagent, a major inconvenience for mobile uses; and secondly, there does not appear to be a simple way for regulatory assurance that the supply would be replenished.

There is a present need for practical improvements which would permit the reliable use of selective catalytic reduction, utilizing an aqueous nitrogenous reducing reagent, to reduce emissions of $NO_x$ from diesel engines.

2. Background Art

Diesel engine exhaust is a principal deterrent to the more wide-spread use of these efficient power plants. Until technology is developed for controlling $NO_x$ without unduly increasing particulate emissions, gasoline-fueled engines will continue to dominate the scene for mobile water and land use. This is not the best environmental choice, however, because gasoline engines tend to be less efficient and less reliable. A gasoline engine utilizes more fuel and emits more carbon dioxide than a diesel for the same power output. Lean-burn gasoline engines are under development but present $NO_x$-generating problems beyond current technology.

$NO_x$, principally NO and $NO_2$ contributes to smog, ground level ozone formation and acid rain. NO is produced in large quantities at the high combustion temperatures associated with diesel and other lean-burn engines. The $NO_2$ is formed principally by the post oxidation of NO in the diesel exhaust stream.

A number of primary measures have been investigated for the purpose of reducing the formation of $NO_x$ by diesel engines. However, such measures cannot be successful to the extent now seen necessary. Among the primary measures discussed in the literature are exhaust gas recirculation and adjustments to ignition timing. Retarding engine timing is described, for example, in U.S. Pat. No. 5,266,083, and exhaust gas recirculation is described, for example, by Khalil, Levendis, and Abrams in "Reducing Diesel Particulate and $NO_x$ Emissions via Filtration and Particle-Free Exhaust Gas Recirculation", SAE Technical Paper Series, 950736, 1995, and in U.S. Pat. No. 4,609,342. The disclosures of each of these patents are hereby incorporated by reference in their entireties.

Several other approaches involve introducing water into the combustion chamber. For example, Miyamoto, Ogawa and Wang, in "Significant $NO_x$ Reductions with Direct Water Injection into the Sub-Chamber of an IDI Diesel Engine", SAE Technical Paper Series, 950609 February–March 1995, note that direct water injection can effectively reduce the flame temperature and reduce $NO_x$. Also, fuel emulsions have been used with similar results, as described, for example, by Tsao and Wang in "Puffing and Micro-explosion Phenomena of Water Emulsion Fuels", SAE Technical Paper Series, 860304, February 1986.

Selective catalytic reduction (SCR) utilizing ammonia has had some degree of success as a secondary measure for stationary sources and some large-scale marine applications. It's application to typical mobile sources (cars, trucks, buses, boats, and the like) has been proposed, but has required either the use of a hydrocarbon (e.g., diesel fuel), which is expensive, ammonia (Gladden, U.S. Pat. No.

4,403,473) which is hazardous, or urea which presents problems of supply and introduction.

As noted above, selective catalytic reduction is a well proven process for reducing $NO_x$ by very high efficiency, typically 70 to 90%. With ammonia as the reagent, such systems can be designed to operate where significant levels of sulfur and oxygen are present in the exhaust gas. In "'Catalytic Engine' $NO_x$ Reduction of Diesel Engines with New Concept Onboard Ammonia Synthesis System" (SAE Technical Paper Series, 920469, Takiguchi, et al., describe the typical system for ammonia SCR as mixing ammonia with the exhaust gases and passing them over a suitable catalyst (e.g., $V_2O_5$-$TiO_2$) at a temperature of 250° to 500° C. They note the concern with storage of liquid ammonia is so great that the practical application of this technology would be difficult. As an alternative, they propose the onboard generation of ammonia utilizing a catalyst to reform fuel to ammonia. This procedure, however, like that of the typical lean-burn catalyst systems, inherently reduces fuel economy and results in the generation of more carbon dioxide. Moreover, the fuel is taxed, and the tax money is burned with the reagent.

Lean-burn $NO_x$ catalysts have been under development for some years to address the particular difficulties in reducing $NO_x$ generated by lean-burn engines, and achieve some 20 to 40% $NO_x$ reduction. In "Research Results on Processes and Catalyst Materials for Lean $NO_x$ Conversion" ( SAE Technical Paper Series, 962041, 1996), König, et al., note that since 1980, the number of publications in this field has increased exponentially but practical systems are still unavailable. They reported that, on a series of tests on a variety of catalysts on cars and trucks, the best $NO_x$ reduction for lean-burn, spark-ignition automobile engines was 25% and 40% for diesel truck engines. In addition to the problems already noted, they also point out that diesel exhaust presents another problem in that it is not as hot as exhaust from gasoline engines—making the search for a suitable catalyst even more difficult.

European patent specification 558,452 A1, proposes bulky and expensive equipment for introducing urea into a diesel effluent, and does not appear practical from an engineering standpoint, especially for road transport application. Also, see PCT publication WO 95/518,251, by J. D. Peter-Hoblyn. That application enables the use of urea-based SCR by introducing the urea upstream of a diesel particulate trap. In this manner, the trap collects undissociated urea and holds it until it is reduced to a gaseous form useful in an SCR section. However, each of the prior art systems for utilizing urea for SCR, requires the use of separate fuel and reagent tanks. Such systems would always require additional time for replenishing the supply of aqueous reducing reagent. Moreover, there does not appear to be a simple way to assure regulators that the supply would be replenished. Without such an assurance, it is not likely that the technology could be accepted for regulatory compliance.

In an approach related to the use of emulsions for lowering the flame temperature, urea has been added (U.S. Pat. Nos. 5,404,841 and 5,535,708) to the emulsions to achieve some reductions in $NO_x$ due to the mechanism of selective noncatalytic reduction (SNCR). This is to be distinguished from the use of similar additives in diesel fuel for effects such as cetane improvement (see, e.g. U.S. Pat. No. 3,876, 391), without concern for operating under conditions effective for $NO_x$ reduction. But, when the urea is introduced in a fuel emulsion, it is not used as efficiently as would be desired and it is difficult to control the rate of feed.

By way of background, we note simply that SNCR is not practical for most internal combustion systems. Lyon, introduced the SNCR technology in U.S. Pat. No. 3,900,554, having discovered that ammonia could be used to reduce $NO_x$ in a noncatalytic system. The danger of dealing with ammonia, however, remains a problem. Moreover, the temperature of diesel exhaust does not reach that (above 1600° F.) necessary for SNCR. In U.S. Pat. No. 4,208,386, Arand and Muzio extended the SNCR process by finding that urea, like ammonia, can be employed for SNCR systems. However, the same temperature limitation exists.

Thus, there have been a number of approaches proposed for $NO_x$ reduction, but each has limitations which deter its widespread, short-term application to lean-burn engines. Among these approaches, selective catalytic reduction appears to have promise if it were not for the known problems. Storage of SCR chemicals continues to discourage the use of this well-developed technology to reduce $NO_x$ emissions from mobile sources. The development of an SCR system which is simple, reliable, economical and safe, especially in a mobile setting, is an advance the art is awaiting.

BRIEF DESCRIPTION OF THE DRAWINGS

The invention will be better understood and its advantages more apparent from the following detailed description, especially when read in light of the accompanying drawings, wherein.

DISCLOSURE OF THE INVENTION

Figure 1:
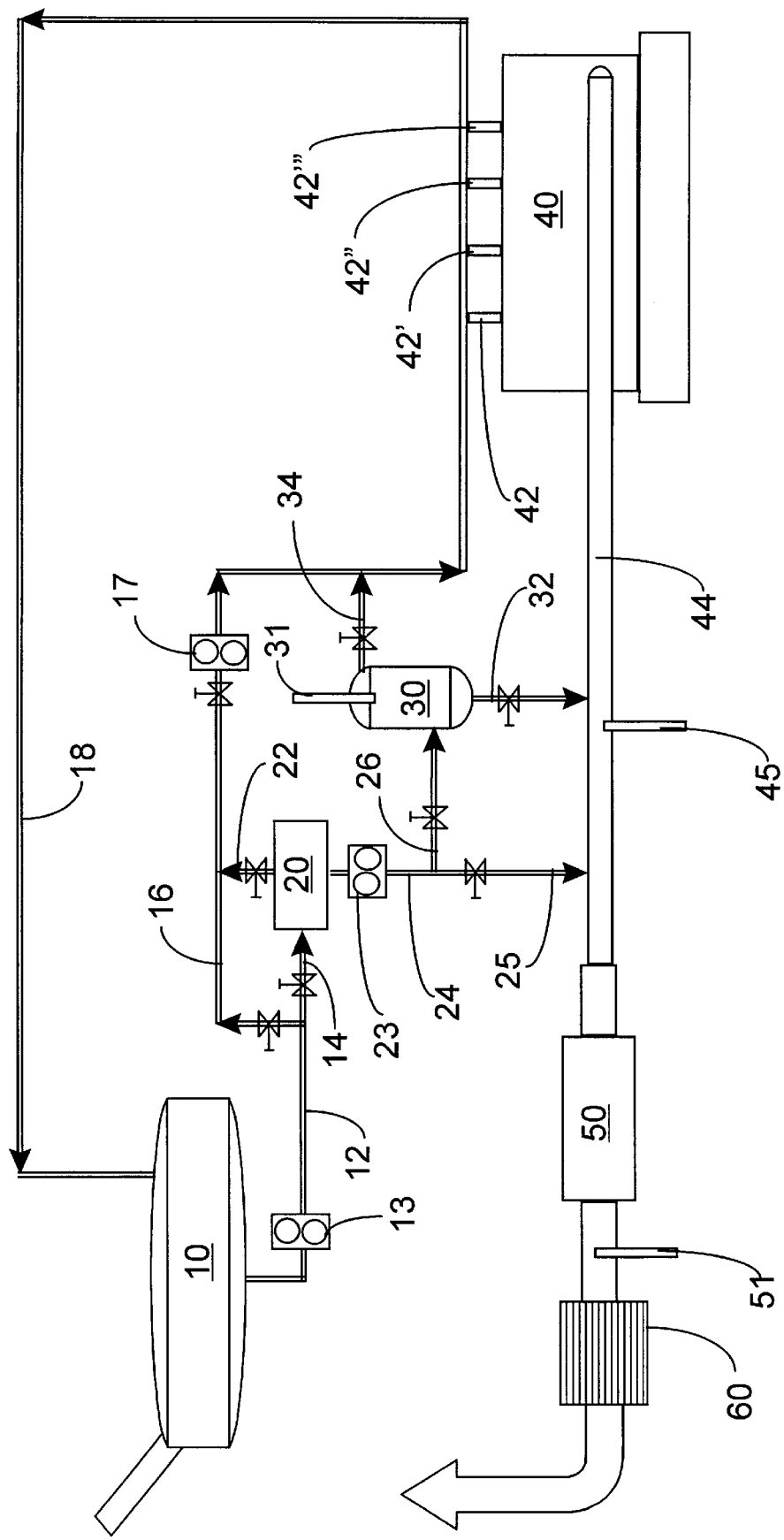
FIG. 1 is a schematic representation of one embodiment of the invention wherein an SCR system utilizing an emulsion of hydrocarbon fuel and an aqueous $NO_x$-reducing reagent is adapted to a lean-burn engine.

It is an object of the invention to provide a simple and effective means for delivering fuel and chemicals required by an engine and a selective catalytic reduction means.

It is a principal object of the invention to provide a practical system enabling the use of selective catalytic reduction for controlling $NO_x$ emissions from diesel and other lean-burn engines, especially mobile diesels.

It is another object of the invention to provide more reliable use of SCR to control $NO_x$ emissions from diesel engines and to, thereby, enable improvement of hybrid systems to meet the overall challenge of diesel emission control.

It is yet another object of the invention to provide a process for simplifying the use of aqueous solutions of nitrogenous reducing reagents for selective catalytic reduction for $NO_x$ control for lean-burn (e.g., diesel) engines.

It is a yet further object of the invention to provide a process to enable use aqueous solutions of nitrogenous reducing reagents for selective catalytic reduction for $NO_x$ control from mobile diesel sources in a manner that assures regulatory compliance.

It is yet another object of the invention to provide a process enabling proper dosage of aqueous solutions of nitrogenous reducing reagents for selective catalytic reduction for $NO_x$ control for the reasons discussed above and as will be explained or otherwise become apparent from the detailed description which follows this section.

These and other objects are achieved by the present invention which provides a process for delivering fuel and reagent required by an engine and a selective catalytic reduction device for controlling emissions from the engine, comprising: preparing an aqueous emulsion comprising fuel for the engine and an aqueous phase containing the reagent; supplying the emulsion to a storage vessel associated with the engine; separating the fuel from the aqueous emulsion to enable separate feed of the fuel to the engine and the reagent to the selective catalytic reduction device.

In one of its more specific aspects, the invention provides a process for powering a lean-burn (e.g., diesel) engine with reduced emissions of $NO_x$, comprising: providing a source of fuel emulsion comprising hydrocarbon fuel and aqueous solution of a nitrogenous $NO_x$-reducing reagent; separating the fuel emulsion into two portions, one being substantially aqueous solution of nitrogenous $NO_x$-reducing reagent, and the other being substantially hydrocarbon fuel; operating the engine by feeding hydrocarbon fuel to the engine, wherein combustion produces hot exhaust gases containing $NO_x$; introducing aqueous solution of nitrogenous $N_x$-reducing reagent into at least a portion of the exhaust gases; and, directing at least a portion of the hot exhaust gases containing the nitrogenous $NO_x$-reducing reagent to a catalyst for selective catalytic reduction of $NO_x$.

It is practical, especially at high-load conditions, to introduce the aqueous solution of $NO_x$-reducing reagent into a slip stream (less than all, e.g., 5–25%) of the exhaust gases to achieve gasification of the reagent prior to mixing with the major or entire portion of exhaust gases. Additionally, it is useful when operating with exhaust gas recirculation, to treat only that portion of the exhaust gases which are not recirculated to the engine.

In its preferred aspects, the fuel emulsion comprises a continuous phase comprising hydrocarbon fuel and from about 1 to about 20% (most preferably, from about 2 to about 10%) of a discontinuous phase comprising an aqueous solution of nitrogenous $NO_x$-reducing reagent (e.g., 5 to 50% urea). It is a preferred option to include in the fuel emulsion a corrosion inhibitor, a biocide and optionally an emulsifier. Preferably, when the concentration of the aqueous phase as a component of the fuel emulsion is high (e.g., 5% or more), the fuel emulsion further comprises a lubricity additive.

It is an advantage of the invention also that catalytic fuel additives can be incorporated into the emulsion as combustion improvers (e.g., reducing particulates, unburned hydrocarbons and/or carbon monoxide) or for purposes of improving the operation of catalytic oxidizers (maintaining their activity) or particulate traps (lowering the ignition temperature and maintaining high activity). In particular, catalytic metal fuel additives including those selected from the group consisting of platinum group metal compositions, cerium compositions, copper compositions, manganese compositions, lithium compositions, sodium compositions, iron compositions, and mixtures of two or more of these, can be used effectively along with the aqueous solution of nitrogenous $NO_x$-reducing reagent. The platinum group metal compositions are preferred. A preferred hybrid process includes the use of the principal process of the invention, and an exhaust system which includes a pass-through a oxidizer to reduce particulates.

DETAILED DESCRIPTION OF THE PREFERRED EMBODIMENTS

In this description, the term "lean-burn engine" is meant to include engines that can be operated with at least a 1% excess of oxygen. Internal combustion engines of the Otto, Diesel and turbine types are included. However, since the problems and advantages of successful achievement of reliable $NO_x$ reduction on diesel engines are so pronounced, the diesel engine is used throughout this description for purposes of example. Stationary and mobile engines are contemplated.

The term "Diesel engine" is meant to include all compression-ignition engines, for both mobile (including marine) and stationary powerplants and of the two-stroke per cycle, four-stroke per cycle and rotary types.

The term "hydrocarbon fuel" is meant to include all of those fuels which form emulsions with aqueous $NO_x$-reducing reagents such as urea, either with or without an added emulsifier. Gasoline, jet fuel, diesel fuel, and various other distillate fuels are included.

The term "distillate fuel" means all of those products prepared by the distillation of petroleum or petroleum fractions and residues.

The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

The term "fuel emulsion" is meant to include any of the hydrocarbon fuels emulsified as to include an aqueous phase. The preferred emulsions are of the water-in-oil type having a dispersed aqueous phase, typically with 1 to 20% aqueous phase. Emulsions with a dispersed oil phase are also contemplated and will typically have higher aqueous phase contents, e.g., up to about 50%. The emulsion can be stabilized or unstabilized, as might be necessary for regulatory, marketing, or storage or operating purposes. It is a preferred option to include a lubricity additive as described in U.S. patent application Ser. No. 98/251,520, filed May 31, 1994, the disclosure of which is incorporated herein by reference, to make up for the reduced lubricity of the emulsion as compared to regular diesel fuel. Effective emulsifiers are known in the art, for example, see U.S. Pat. No. 5,404,841, the disclosure of which in incorporated herein by reference, and preferred ones are described in some detail below. It is also possible to utilize a physical emulsion stabilizers. Exemplary of suitable physical stabilizers are waxes, cellulose products, and gums such as whalen gum and xanthan gum.

The term "nitrogenous $NO_x$-reducing reagent" is broad enough to include all of those nitrogenous materials known to reduce $NO_x$ in the presence of a $NO_x$ reducing catalyst. Among the preferred suitable $NO_x$-reducing reagents are those that are normally liquid or solid at temperatures up to 50° C. and do not readily hydrolyze to ammonia or other gaseous species under the conditions of storage urea but can be broken down (with a catalyst if necessary) into the effective gaseous species (e.g., $NH_i$ and HCNO radicals) at temperatures practical for diesel engines, e.g., from about 200° to about 650° C., including the following: ammonia, urea, ammonium carbamate and the alkali metal and alkaline earth carbamate salts; urea hydrolysis products, including ammonium carbonate and ammonium bicarbonate; urea dimers and polymers, such as biuret; urea adducts; urea condensation products amines, such as melamine, triethyl amine and ethanol amine; and the like. It is desired that the $NO_x$-reducing reagent not readily hydrolyze to ammonia or other gases under the conditions of storage, e.g., temperatures of –30° to 50° C., because the presence of gaseous species requires pressure storage, and it is not desirable to store fuel under pressure. See U.S. Pat. Nos. 5,057,293 and 5,489,419 for a more complete listing of effective nitrogenous $NO_x$ reducing reagents, the disclosures of which are hereby incorporated by reference in their entireties. The aqueous solutions of these reagents can be employed up to the solubility limits of the particular reagent. Typically, in the case of urea, the aqueous solution nitrogenous $NO_x$-reducing reagent will contain from about 5 to about 50% urea based on the weight of the solution. A narrower range is from about 25 to about 40%, e.g. about 35%.

FIG. 1 shows a schematic of a system which can be employed to carry out the process of the invention. Tank 10 represents a source of fuel emulsion according to the invention, the fuel emulsion in this exemplary situation comprising an emulsion of diesel fuel and an aqueous solution of a nitrogenous $NO_x$-reducing reagent.

The fuel emulsion flows from the tank 10 via line 12 and is fed with the aid of pump 13 to separating means 20 for separating the fuel emulsion into a water-soluble fraction and a fuel-soluble fraction. The separating means 20 can be bypassed, if desired by sending the fuel emulsion directly to line 16 from line 12, then to line 41 for introduction into the cylinders of diesel engine 40 by means of fuel injectors 42, 42', 42" and 42'". The water-soluble fraction comprises substantially the aqueous solution of a nitrogenous $NO_x$-reducing reagent. By the term "substantially aqueous solution" it is meant that the fraction will have a continuous aqueous phase that may or may not have dispersed hydrocarbon fuel therein. The other fraction, the fuel-soluble fraction, comprises substantially diesel fuel. By the term "substantially hydrocarbon (diesel) fuel" it is meant that most of the aqueous phase has been removed.

The fuel-soluble fraction is drawn off via line 22, and the water-soluble fraction is drawn off by line 24. The fuel-soluble fraction can contain some or all of the aqueous solution of $NO_x$-reducing reagent. If some of the aqueous solution of $NO_x$-reducing reagent remains in the fuel-soluble fraction, it will have some effect on $NO_x$ reduction, and does not significantly, negatively affect engine efficiency. Minor tuning adjustments may have to be made, however. The water-soluble fraction drawn off via pump 23 and line 24 can be sent directly to the exhaust pipe 44 from engine 40 or can be sent to surge tank 30, from which it is fed into the exhaust system. The surge tank 30 can be integral with the separation means, as is in fact the case with the second of the two exemplary separating means described below.

The separating means 20 can be any of those filters or centrifugal separators known to the art for separating fuel and water. Among the suitable separation devices, may be mentioned the Westfalia intermittent self-cleaning centrifuge, such as described in the Diesel Engineering Handbook, pages 215–216, 1971, and the Winn Fuel Systems, Inc., Series C diesel fuel filter/separator systems, as described in Diesel Progress, Engines & Drives, pages 20, et seq., August, 1996; and other separators as shown on pages 214–215 of the above-noted Diesel Engineering Handbook.

An advantage of the invention is the discovery that aqueous solutions of nitrogenous $NO_x$-reducing reagents suitable for operating SCR systems can be stored in the same tank as the fuel (in the form of emulsions), separated as needed and then supplied to an SCR unit on diesel-powered mobile units (e.g., boats, and land vehicles). The emulsions are split into their component parts, one for fueling the engine and the other for reducing $NO_x$. The separation need not be complete and not all of the emulsion need be subjected to separation. Indeed, if some aqueous solution remains in the fuel sent to the combustion chamber, it will not have a significant adverse affect on the emissions, and there is data suggesting that it may be beneficial for $NO_x$ reduction. And, if some hydrocarbon contaminates the aqueous phase, this can have a beneficial effect on the operation of the SCR under conditions specific to various catalysts.

The degree to which separation of the two phases is accomplished will depend on a number of factors including: balancing equipment cost against operating costs, the immediate demands for $NO_x$-reducing reagent, the degree to which surge tank 30 is filled, the temperature of the exhaust gases, the temperature of the SCR catalyst, the amount of ammonia passing through the SCR unit unreacted, and the temperature of the fuel emulsion.

Diesel engines (as well as some other engines) typically have fuel injection systems in which fuel circulates from the fuel tank 10 to the engine 40, and excess fuel returns via line 18 to the tank. A pump 13 is used for this process and the rate of fuel circulation is always greater than the rate fuel is consumed in the engine. At low loads, the fuel consumed may be only a small percentage of the fuel circulated.

The $NO_x$ emissions from an engine are typically small at idle and low-load conditions when fuel consumption is the least, and greatest at high-load conditions where fuel consumption is greatest. From a very practical standpoint, it is an advantage that the invention permits regulating the flow of $NO_x$ reducing reagent in proportion to $NO_x$ production. At idle and under low-load conditions, it is expected that exhaust gas temperatures will be too low for SCR to react the gasified $NO_x$-reducing reagent effectively with the $NO_x$, in which case it may be required for reagent flow to be stopped.

The emission of $NO_x$ from an engine is affected by the way the engine is controlled. For example, exhaust gas recirculation can be switched on and off, or otherwise modulated, to accommodate various load conditions. Also, injection timing can be altered for different engine operating conditions, and turbochargers can be controlled to have variable output according to engine conditions. Thus, $NO_x$ emissions can be a function of a number of variables in the engine, and are not a single function of fuel consumption or engine load. In order to optimize the use of the SCR system, it is desirable to be able to control reagent feed, as well as shut it down as desired.

Means are provided (e.g., level sensor 31 in tank 30, $NO_x$ sensor 45 and temperature sensor 51 in the exhaust line) to sense each of the desired control parameters and generate control signals representative of the sensed values. The control signals are then compared to reference signals stored in a control computer, and operating signals are generated by the control computer to operate the various pumps and valves necessary to assure proper flow in each of the lines. For example, an engine of a particular type can be run and measurements taken to determine the amount of $NO_x$ produced under various load conditions and used to make the comparisons. If desired, feedback control can be utilized to adjust the initial control signals.

Under normal load conditions, at least about 10%, preferably from 75% to about 99%, of the aqueous solution is separated from the fuel emulsion before the fuel is combusted in the engine. It may be desired to obtain separation as complete as possible to make the most efficient use of the urea or other $NO_x$-reducing chemical. The ability to provide variable separation is advantageous to better control the amount of reagent that must be stored in a surge tank 30, the amount of reagent that can be added to the SCR unit 60, and the amount of fuel emulsion fed to the engine 40. Line 34 is shown to extend from surge tank 30 to line 16 to provide an overflow line which can discharge excess aqueous $NO_x$-reducing reagent into the fuel for combustion with the fuel. If desired, an in-line or other mixing device 29 can be provided to assure dispersion of the aqueous and fuel components. It is also possible, once the surge tank 30 is full or as otherwise called for, to direct flow of the aqueous $NO_x$-reducing reagent directly into the exhaust line 44 via line 25. It is also possible to provide simultaneous feed to line 44 via lines 25 and 32.

The fuel emulsions of the invention preferably include from about 1 to about 20% (more narrowly, 2 to 10%) of the aqueous phase, for the purpose of controlling the amount of $NO_x$ emitted to the atmosphere form the exhaust system. Under proper circumstances for some engines, the introduction of a portion of the reagent with the fuel to the engine combustion chamber can be beneficial for obtaining additional $NO_x$ reduction while providing a convenient means for disposing of excess urea or other reagent. In most cases it will not be a detriment, but the control of the separation can provide a number of advantageous options. For example, it will be necessary to provide an excess of urea or other reagent to ensure that there is sufficient urea to meet the demands for times of maximum $NO_x$ production, it is an advantage of the invention that a single fuel emulsion can be supplied in the manner normally associated with fueling and can supply an SCR unit with $NO_x$-reducing reagent at a variable rate as required. It is also an advantage of the invention that the resulting necessary excess $NO_x$-reducing reagent can be disposed of in an environmentally-benign manner.

Engine 40 is operated by feeding the hydrocarbon fuel from line 16 and 41 as noted above. Combustion of the fuel in the cylinders of the engine creates hot exhaust gases containing $NO_x$. The hot combustion gases are withdrawn from line 44, which can comprise any suitable exhaust system component. The water-soluble fraction from line 25 and/or line 32 is fed to line 44 and introduced there into. The amount introduced will be determined by a suitable control system operating the various valves in the noted lines in the manner described above, for example.

The hot combustion gases in the line 44 will comprise at least a portion of the exhaust gases, and will typically be all of them. If desired, or necessary due to the engineering of a particular system, a mixing device 50 (comprising simply baffled chambers or other means for in-line mixing, by static or dynamic means, including the use of a particulate trap as described in PCT publication WO 95/518,251, by J. D. Peter-Hoblyn) or a trap designed specifically to trap and hold any reagent until it is fully gasified, upstream of SCR catalyst 60. It might also be a hydrolysis or pyrolysis unit to assure gasification of the urea or other reagent.

The SCR catalyst can be of the type (e.g., "Development of Zeolite Catalysts For $NO_x$ Reduction With $NH_3$ in Diesel Exhaust Gas": ERI ITO, 28 Oct. 1996, Delft University) that is tolerant to overdosing of ammonia and can convert any excess ammonia or other gaseous nitrogenous species from the $NO_x$-reducing reagent to harmless species such as nitrogen and water. This is an especially advantageous combination of the invention because it facilitates the removal of excess reagent by feeding it with the fuel for combustion without concern for the presence of large quantities of ammonia in the exhaust. Alternatively, or in addition, a pass-through oxidation catalyst can be employed (upstream of the point of reagent introduction or following the SCR unit) to reduce emissions of unburned hydrocarbon and carbon monoxide by oxidizing them. At least a portion of the hot exhaust gases containing the nitrogenous $NO_x$-reducing reagent (typically, all) is brought into contact with a catalyst for selective catalytic reduction of $NO_x$ in SCR reactor 60.

It is sometimes practical, especially at high-load conditions, to introduce the aqueous solution of $NO_x$-reducing reagent into a slip stream (less than all, e.g., 5–25%) of the exhaust gases to achieve gasification of the reagent prior to mixing with the major or entire portion of exhaust gases. When operating with exhaust gas recirculation, to treat only that portion of the exhaust gases which are not recirculated to the engine.

Figure 2:
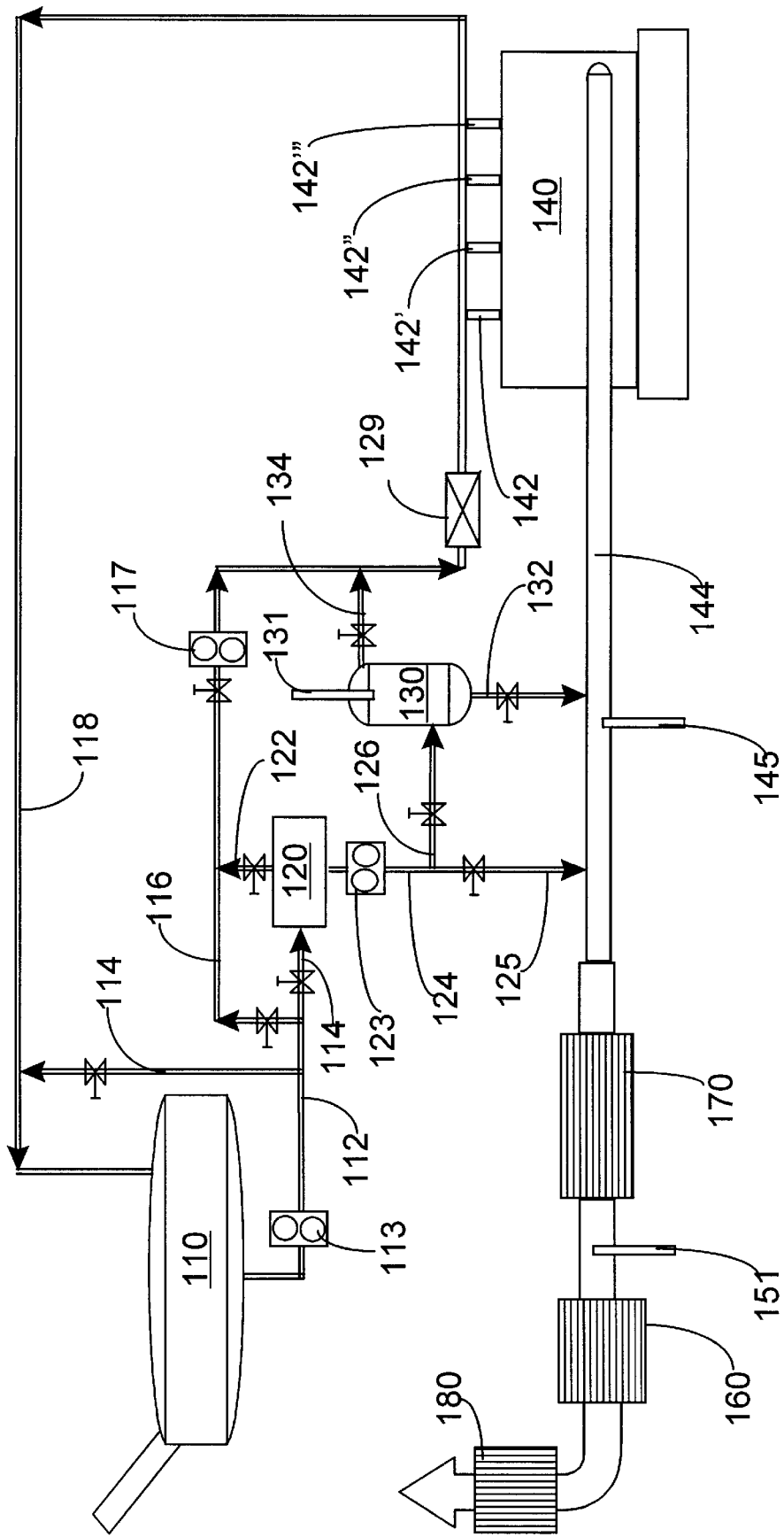
FIG. 2 is a schematic representation of another embodiment of the invention, wherein an unstabilized emulsion is employed in a lean-burn, SCR system employing a urea-hydrolysis catalyst upstream of the SCR catalyst and an oxidation catalyst following the SCR catalyst.
Figure 3:
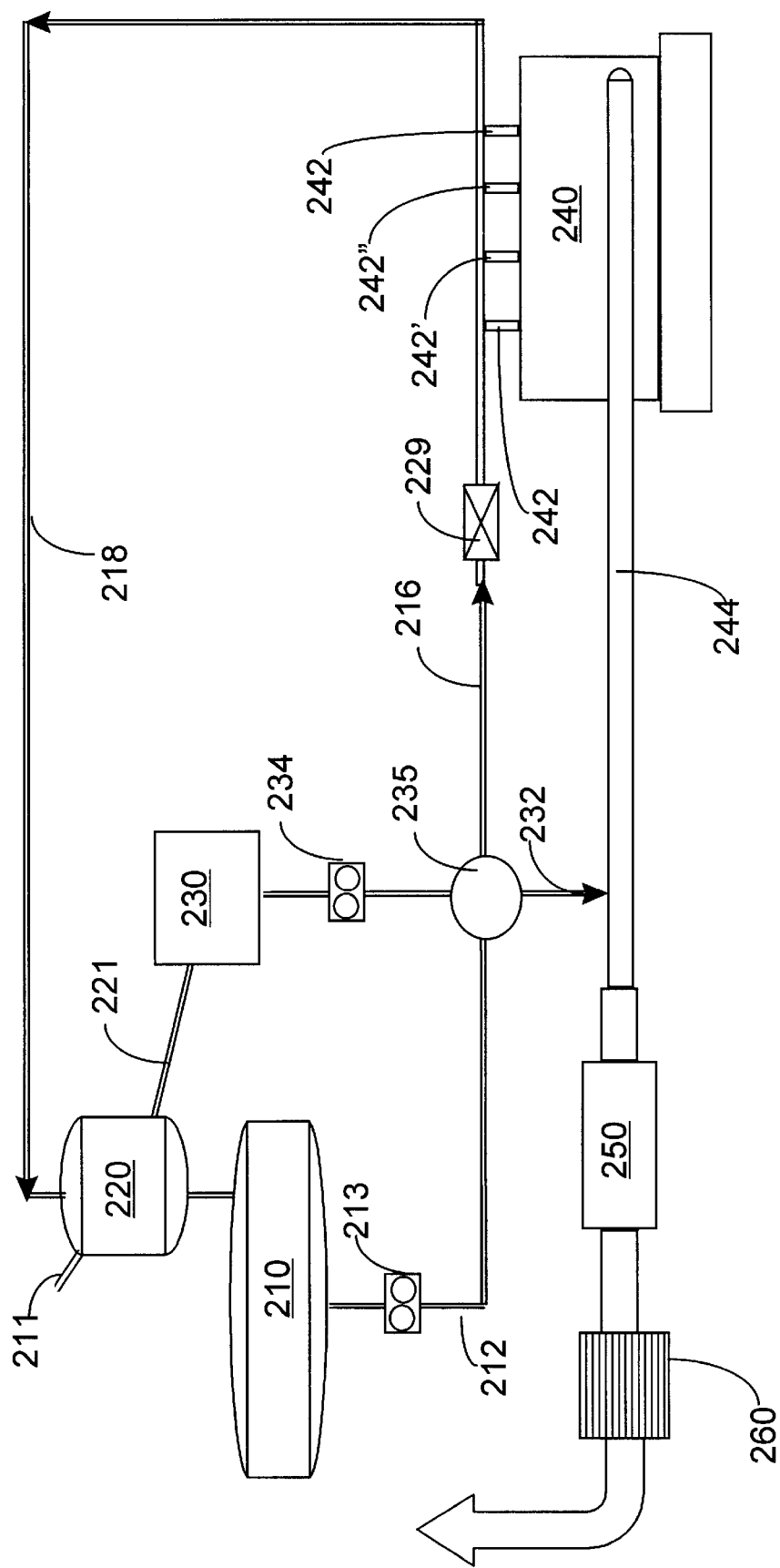
FIG. 3 is a schematic representation of another alternative embodiment of the invention wherein an unstabilized emulsion is separated on fueling a lean-burn engine employing an SCR system.

Emulsions of hydrocarbon fuel and a nitrogenous $NO_x$-reducing reagent according to the invention can in some cases be unstabilized, such as in the embodiments of FIGS. 2 and 3, and in some cases should be stabilized, as preferred in the embodiment of FIG. 1. The stabilized emulsions will preferably be stable for at least 30 days. Effective emulsifiers are known in the art, for example, see U.S. Pat. No. 5,404,841, the disclosure of which in incorporated herein by reference.

Reference is now made to the embodiment of FIG. 2, wherein elements or structures which are fully equivalent to those in FIG. 1, will be given a three-digit number in the 100 series. Thus, where the fuel tank in FIG. 1 is given the reference numeral 10, it is given the number 110 in FIG. 2. This embodiment takes advantage of the fact that the emulsions employed according to the invention need not be stabilized. Thus, a fuel emulsion is prepared without sufficient added emulsifier to provide long term stability, and is filled via line 111 into tank 110. Once in tank 110, the fuel emulsion will eventually partially separate into its component parts unless precautions are taken. Thus, a recycle line 15 is employed to assure constant agitation of the fuel emulsion in tank 110. The aqueous $NO_x$-reducing reagent will be heavier than the hydrocarbon fuel and will settle to the bottom from which it can be withdrawn via line 112 with the aid of pump 113. A sensor 115 is employed to check on the level of the aqueous phase at the bottom of the tank to assure against inadvertent entry of the aqueous phase into line 116 which feeds hydrocarbon fuel to the engine 140 by means of line 116 and aided by pump 117.

This embodiment employs a catalyst 170 upstream of the SCR catalyst 160, for the purpose of hydrolysing the urea or equivalent reagent, and an oxidation catalyst 180 downstream of the SCR catalyst. Hydrolysis and oxidation catalysts are described for example in U.S. patent application Ser. No. 08/626,780 filed Apr. 2, 1996 by Valentine, Peter-Hoblyn and Sprague, the disclosure of which is incorporated herein by reference. The hydrolysis catalyst can be heated by the exhaust gases or by auxilliary means such as an electrical heater. It can include a gasification chamber or simply be a pass-through device.

Reference is now made to the embodiments of FIG. 3, which again employs an unstabilized emulsion. In this embodiment, the unstabilized fuel emulsion is fed to the system, feed line 211. Device 220 is a suitable separation unit, such as one having a Teflon® polytetrafluoroethylene filter member separating a fuel side chamber from a water side chamber. A device of this type will permit separation of the component phases of the fuel emulsion on a continuous basis. The aqueous phase can be drawn from the water side of device 220 via line 221 which passes it to surge tank 230 from which it can be passed to line 244 via line 232 with the aid of pump 234. A suitable multi-pass valve 235 can direct flow of hydrocarbon fuel via line 212 with the aid of pump 213 to the engine 240. Valve 235 can also provide passage of aqueous phase directly to line 232 or can divert it to line 216 which can include a suitable in-line mixing device 229 in order to burn excess reagent in the engine.

The selective catalytic reduction system depends on decomposing urea, or other reagent which is normally liquid or solid before solution with water, into ammonia or other active gaseous species, and for mixing with the exhaust gases. These functions can be performed by one or more component subsystems, e.g., as described above or by other suitable means, that operate after the exhaust gas exits the engine and, in general, SCR does not require any special tuning of the engine. Therefore, the engine may be tuned or the engine system configured to optimize fuel economy and or minimize particulates or other emissions. Indeed, it is preferred to tune the engine in many circumstances to achieve within 2% of maximum fuel economy.

Because it is possible to configure the SCR system to operate at high reduction efficiencies, it is possible to achieve benefits either in engine performance or manufacturing cost reductions by obviating the need for other systems such as injector timing retard. Incorporation of SCR allows the engine designer greater opportunity to optimize engine design.

There are cases, however, whether imposed by regulation or determined to be the best combination of technologies, where it will be desirable to employ a hybrid system comprising a combination of SCR along with another technique to control $NO_x$ emissions, such as exhaust gas recirculation or retarding engine timing.

Exhaust gas recirculation is a well-known and understood technique which recirculates a part of the engine exhaust back to the engine with incoming fresh combustion air. The net effect is to reduce $NO_x$. Reference can be made to published descriptions for exhaust gas recirculation techniques that can be employed in combination with the improvements in SCR provided by the invention to provide a hybrid system of SCR and exhaust gas recirculation that produces results beyond those systems now known. Among the referenced exhaust gas recirculation techniques are those described, for example, by Khalil, Levendis, and Abrams in "Reducing Diesel Particulate and $NO_x$ Emissions via Filtration and Particle-Free Exhaust Gas Recirculation", SAE Technical Paper Series, 950736, 1995, and in U.S. Pat. No. 4,609,342.

In another aspect of the invention, the injection timing of a diesel engine can be set (for instance retarded or set during manufacture of the engine) in a manner designed to reduce the nitrogen oxides emissions from the engine after combustion of a hydrocarbon fuel. See, for example, U.S. Pat. No. 5,266,083, for a more complete description, and the disclosure of this patent is incorporated herein by reference.

In another aspect of the invention, a diesel engine is provided having a particulate trap or pass through oxidation catalyst disposed such that the exhaust stream from the engine passes therethrough. These devices can be either precatalyzed or catalyzed by addition of catalyst metal compositions to the intake air, the fuel, or the exhaust gases as taught in U.S. patent application Ser. No. 08/514,978, filed Aug. 14, 1995, the disclosure of which is incorporated herein by reference.

An uncatalyzed particulate trap can be disposed downstream from the exhaust manifold and upstream of the SCR catalyst, in the position of 50 illustrated in FIG. 1. This has a number of advantages including the fact that the trap helps promote mixing of the $NO_x$-reducing reagent in the exhaust and can trap and hold any ungasified reagent. A particulate trap can help to at least partially eliminate the particulates generated by retarding the injection timing, employing exhaust gas recirculation or when the burning of the fuel emulsions with less than full separation, cause increases in particulates. Moreover, a catalytic metal-containing compositions, e.g., as a fuel additive, can also decrease the ignition temperature of particulates collected on the trap. This can facilitate regeneration of the trap for greater efficiency. Benefits are achievable for platinum group metal catalyst-containing compositions (including reductions in hydrocarbons, carbon monoxide, and trap balance point temperature) and are not adversely affected by the presence of auxiliary catalyst-metal containing compositions such as cerium, copper, iron, manganese, sodium or lithium, making it possible to obtain the positive benefits of both the platinum group metal catalyst and the auxiliary catalyst while at the same time taking effective action to reduce $NO_x$. Also, see PCT publication WO 95/518,251, by J. D. Peter-Hoblyn, the disclosure of which is incorporated by reference.

Pass-through oxidation catalysts or precatalyzed particulate traps are also preferably disposed upstream of the SCR catalyst and urea introduction zone or after the SCR catalyst, and are especially designed to reduce the SOF (soluble organic fraction) of particulates, and the gaseous components of the exhaust which are the results of incomplete combustion, namely unburned hydrocarbons and carbon monoxide. Unlike traps, the pass-through catalytic oxidizers do not filter out or otherwise trap the particulates. The general construction and operation of these devices are well known, but the combination of the $NO_x$ control technique of the invention with these known particulate control techniques provide highly-effective hybrid systems capable of defeating the known problems of reducing both $NO_x$ and particulates. See also, U.S. Pat. No. 5,501,714, the disclosure of which is incorporated by reference.

Preferably, the addition of fuel additives to fuel emulsions which are employed according to the invention to reduce $NO_x$, can effectively control the emission of hydrocarbons and carbon monoxide, particular fuel additives include those selected from the group consisting of platinum group metal compositions, copper compositions, manganese composition, lithium compositions, cerium compositions, sodium compositions, iron compositions, and mixtures of two or more of these. The platinum group metal compositions are preferred as sources of catalytic metals.

Among the effective platinum group metal catalyst compositions are any of those effective to release catalytic platinum group metal in the combustion chamber. Platinum group metals include platinum, palladium, rhodium, ruthenium, osmium, and iridium. Compositions including platinum, palladium, and rhodium, especially compounds of platinum alone or possibly in combination with rhodium compounds are preferred on the basis of their relatively high vapor pressures.

Among these platinum group catalyst metal compositions are those described by the patents and applications incorporated by reference above. Particularly preferred are platinum group metals in the form of compositions (typically, specific compounds or reaction mixtures) which can be dissolved in or dispersed in the fuel either directly or in an emulsion. These compositions will, upon initiation of combustion release the active form of the catalyst metals. Included specifically, are the petroleum-soluble organometallic platinum group metal coordination compounds discussed in or embraced by U.S. Pat. No. 4,891,050 and Pat. No. 4,892,562 to Bowers, et al., U.S. Pat. No. 5,034,020 to Epperly, et al., and U.S. Pat. No. 5,266,093 to Peter-Hoblyn, et al. In addition, the catalyst composition present in the fuel can be comprised of more water-sensitive and even water soluble compounds. A representative listing of these types of compounds is given below. A representative listing of the petroleum-soluble compounds is found in the above cited patents which are hereby incorporated by reference in their entireties.

It is an advantage of the invention that water-soluble platinum group metal compositions, as well as those with varying degrees of solubility in hydrocarbon fuels, can be employed without the presence of water releasing the platinum from the fuel either by precipitation or by plating out on fuel storage or supply surfaces. These include compounds where the platinum group metal exists in oxidation states II and IV.

U.S. Pat. No. 4,891,050 to Bowers, et al., U.S. Pat. No. 5,034,020 to Epperly, et al., and U.S. Pat. No. 5,266,093 to Peter-Hoblyn, et al., describe platinum group metal compounds which are highly-soluble in fuel and have high partition ratios. The entire disclosures of these patents are incorporated herein by reference for their descriptions of suitable platinum group metal compounds and procedures for preparing them. In addition to these materials, are commercially-available or easily-synthesized platinum group metal acetylacetonates, platinum group metal dibenzylidene acetonates, and fatty acid soaps of tetramine platinum metal complexes, e.g., tetramine platinum oleate. In addition, there are the water soluble platinum group metal salts such as chloroplatinic acid, sodium chloroplatinate, potassium chloroplatinate, iron chloroplatinate, magnesium chloroplatinate, manganese chloroplatinate, and cerium chloroplatinate, as well as any of those compounds identified or included within the description set forth by Haney and Sullivan in U.S. Pat. No. 4,629,472.

Typically, the platinum group metal catalyst composition will be employed in an amount sufficient to supply the platinum group metal within the range of from about 0.05 to about 10 milligrams of platinum group metal per liter of fuel, preferably from about 0.1 to about 1 milligrams of platinum group metal per liter of fuel. A more preferred range is from about 0.10 to about 0.5 milligrams of platinum group metal per liter of fuel. The higher concentrations would be useful as a concentrate intended for intermittently applying doses to the fuel, the combustion air or the exhaust gases.

In alternative embodiments the additives can be employed with auxiliary catalytic metal compositions utilized for improving economy, reducing emissions of pollutants such as hydrocarbons and carbon monoxide, and for improving the operation of particulate traps or oxidation catalysts. Among the useful auxiliary catalytic metal compositions are salts of manganese, iron, copper, cerium, sodium, lithium and potassium, which can be employed at suitable levels, e.g., from about 1 to about 100 ppm and preferably 30 to 60 ppm of the catalyst metal in combination with the platinum group metal composition in diesel fuels or gasoline. For gasoline engines, the manganese compounds are useful to improve fuel octane. For diesel engines, the manganese, iron, copper, cerium, sodium, and lithium compounds are effective to reduce the ignition temperature of particulates captured in a diesel trap. In combination with the platinum group metals it is possible to significantly reduce carbon monoxide and unburned hydrocarbons while removing particulates more easily from the trap. The above references and those cited therein are incorporated by reference to show specific salts and other compounds of these metals, including the acetonates, proprionylacetonates, and formylacetonates.

Among the suitable lithium and sodium compositions are the salts of lithium and sodium respectively, with suitable organic compounds such as alcohols or acids, e.g., aliphatic, alicyclic and aromatic alcohols and acids. Exemplary of particular salts are the lithium and sodium salts of tertiary butyl alcohol and mixtures of these. Other lithium and sodium organic salts are available and suitable for use to the extent that they are fuel-soluble and are stable in solution. While not preferred, inorganic salts can also be employed to the extent that they can be efficiently dispersed in the fuel, such as in a stable emulsion or otherwise. The specific chemical compounds will be selected to avoid fouling of engine or other parts.

Among the specific sodium compounds are: the salts of sulfonated hydrocarbons, for example sodium petroleum sulfonate, available as Sodium Petronate from Witco Chemical ($NaO_3SR$, R=alkyl, aryl, arylalkyl, and R is a hydrocarbon having greater than three carbons); sodium alcoholates, for example sodium t-butoxide and other fuel-soluble alkoxides (NaOR, wherein R is a lower alkyl, e.g., from 1 to 3 carbons; and sodium napthenate (sodium salts of napthenic acids derived from coal tar and petroleum). Among the specific lithium compounds are the lithium analogs of the above sodium compounds.

Among the specific cerium compounds are: cerium III acetylacetonate, cerium III napthenate, and cerium octoate and other soaps such as stearate, neodecanoate, and octoate (2-ethylhexoate). These cerium compounds are all trivalent compounds meeting the formula: $Ce(OOCR)_3$, wherein R=hydrocarbon.

Among the specific copper compounds are: copper acetylacetonate, copper napthenate, copper tallate, and soaps like stearate and the like including octoate and neodecanoate. These copper compounds are all divalent compounds, with the soaps meeting the formula: $Cu(OOCR)_2$. In addition, products of copper compounds with various organic substrates to form an organometallic complex as disclosed by Lubrizol patents such as International Publication Number WO 92/20764.

Among the specific iron compounds are: ferrocene, ferric and ferrous acetyl-acetonates, iron soaps like octoate and stearate (commercially available as Fe(III) compounds, usually), iron pentacarbonyl $Fe(CO)_5$, iron napthenate, and iron tallate.

Among the specific manganese compounds are: methylcyclopentadienyl manganese tricarbonyl ($CH_3C_5H_4MN(CO)_3$, as described for example in U.S. Pat. No. 4,191,536 to Niebylski; manganese acetylacetonate, II and III valent; soaps including neodecanoate, stearate, tallate, napthenate and octoate.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims. For conciseness, several conventions have been employed with regard to listings of chemicals and ranges. The listings of chemical entities throughout this description are meant to be representative and are not intended to exclude equivalent materials, precursors or active species. Also, each of the ranges is intended to include, specifically, each integer, in the case of numerical ranges, and each species, in the case of chemical formulae, which is encompassed within the range. The claims are meant to cover the claimed components and steps in any sequence which is effective to meet the objectives there intended, unless the context specifically indicates the contrary.

We claim:

1. A process for delivering a fuel and a reagent required by an engine and a selective catalytic reduction device for controlling emissions from the engine, comprising:

preparing an aqueous emulsion comprising the fuel for the engine and an aqueous phase containing the reagent;

supplying the emulsion to a storage vessel associated with the engine;

separating the fuel from the aqueous emulsion to enable separate feed of the fuel to the engine and the reagent to the selective catalytic reduction device.

2. A process for delivering fuel and reagent according to claim 1, wherein the emulsion is stabilized by a chemical emulsification reagent.

3. A process for delivering fuel and reagent according to claim 1, wherein the emulsion is unstabilized.

4. A process for delivering fuel and reagent according to claim 1, wherein the emulsion is at least partially separated during the step of supplying the emulsion to storage means associated with the engine.

5. A process for delivering fuel and reagent according to claim 1 wherein, the emulsion is separated by mechanical means positioned in a feed line between storage means associated with the engine for storing the emulsion and the engine.

6. A process for delivering fuel and reagent according to claim 1 wherein, the aqueous reagent separated from the fuel is stored in a surge tank up stream of and arranged to supply reagent to the selective catalytic reduction device.

7. A process according to claim 6 wherein the reagent is supplied to the selective catalytic reduction device at a varying rate determined by a control system.

8. A process according to claim 1 wherein the reagent is present in the fuel in an amount in excess and the extra reagent is fed to the engine for combustion with the fuel.

9. A process according to claim 8 wherein the reagent is fed to the engine as part of the emulsion, bypassing the separation means.

10. A process according to claim 8 wherein the reagent is fed to the engine from the surge tank.

11. A process according to claim 8 wherein the selective catalytic reduction system comprises a catalyst capable of removing ammonia from the exhaust.

12. A process for powering a lean-burn engine with reduced emissions of $NO_x$, comprising:

providing a source of fuel emulsion comprising a hydrocarbon fuel and an aqueous solution of a nitrogenous $NO_x$-reducing reagent;

separating the fuel emulsion into two portions, one being substantially aqueous solution of a nitrogenous $NO_x$-reducing reagent, and the other being substantially the hydrocarbon fuel;

operating the engine by feeding separated hydrocarbon fuel to the engine, wherein combustion produces hot exhaust gases containing $NO_x$;

introducing the aqueous solution of nitrogenous $NO_x$-reducing reagent into at least a portion of the exhaust gases; and, directing at least a portion of the hot exhaust gases containing the nitrogenous $NO_x$-reducing reagent to a catalyst for selective catalytic reduction of $NO_x$.

13. A process according to claim 12 wherein the emulsion comprises a continuous phase comprising diesel fuel and from about 1 to about 20% of a discontinuous phase comprising water and a water-soluble $NO_x$-reducing reagent selected from the group consisting of urea, carbamate salts, urea precursors, urea adducts, urea condensation products, urea hydrolysate products, urea dimers and polymers, amines and mixtures of any of these.

14. A process according to claim 13 wherein the fuel further comprises a lubricity additive.

15. A process according to claim 12 wherein the fuel further comprises a fuel additive selected from the group consisting of platinum group metal compositions, cerium compositions, copper compositions, manganese composition, lithium compositions, sodium compositions, iron compositions, and mixtures of two or more of these.

16. A process according to claim 15 wherein the fuel emulsion comprises from 10 to 50% of the aqueous solution of $NO_x$-reducing reagent in a continuous aqueous phase.

17. A process according to claim 12 wherein exhaust gases produced during combustion are passed to an exhaust system which includes a pass-through an oxidizer.

18. A process according to claim 12 wherein from 10 to 99% of the aqueous solution is separated from the emulsion before the fuel is combusted in the engine.

19. A process according to claim 12 wherein the aqueous solution of $NO_x$-reducing reagent in the fuel emulsion contains from 5 to 50% urea.

20. A process according to claim 12 wherein the fuel further comprises a corrosion inhibitor and an emulsifier, said emulsifier being effective to stabilize the diesel fuel and the water for periods of in excess of 30 days.

* * * * *